Dec. 24, 1968  G. W. CLEVERSEY  3,418,449
ADHESIVE ACTIVATING APPARATUS
Filed June 7, 1966  4 Sheets-Sheet 1

Inventor
Gerald W. Cleversey
By his Attorney
Vincent A. White

Dec. 24, 1968  G. W. CLEVERSEY  3,418,449
ADHESIVE ACTIVATING APPARATUS
Filed June 7, 1966  4 Sheets-Sheet 2

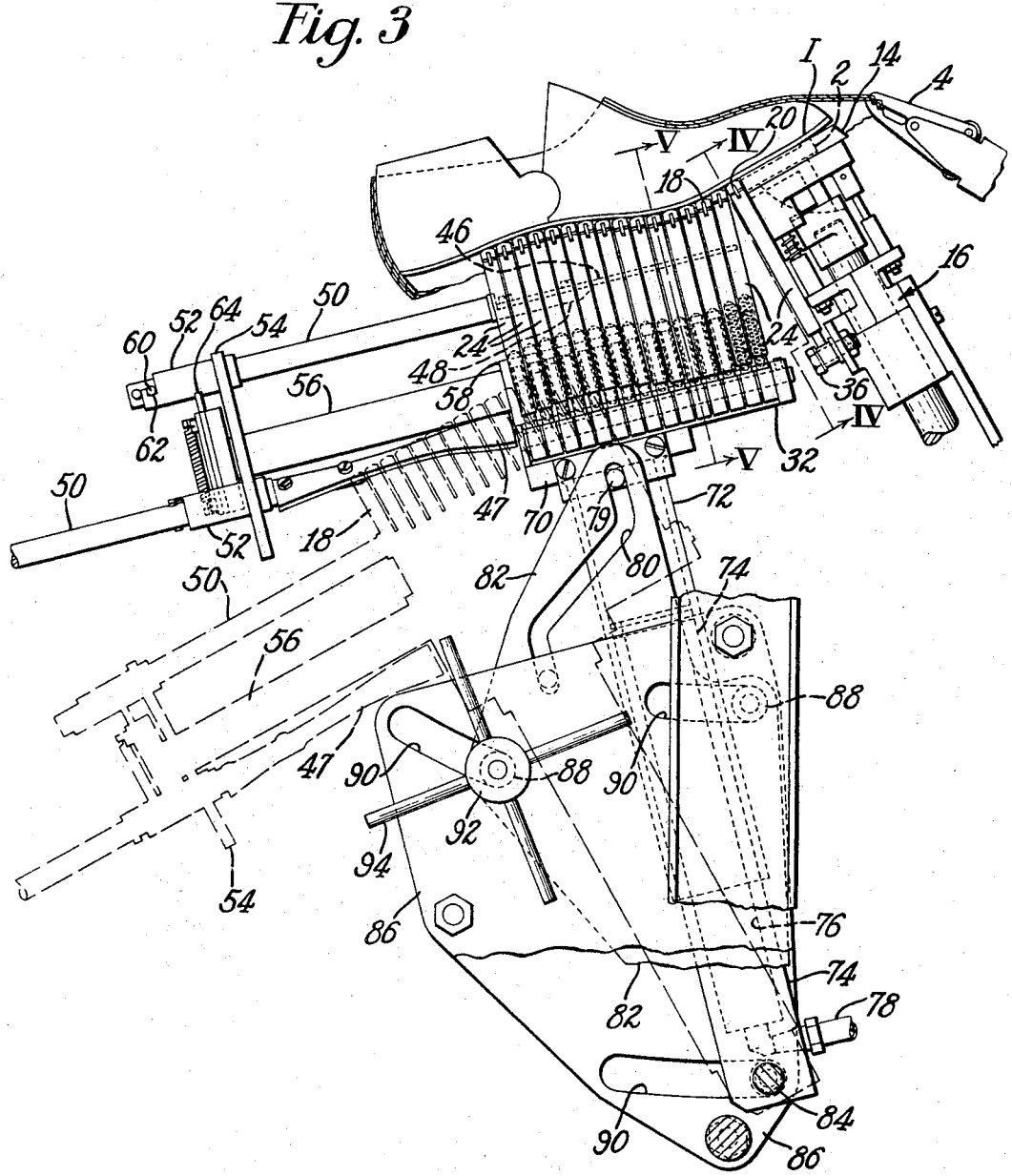

Dec. 24, 1968  G. W. CLEVERSEY  3,418,449
ADHESIVE ACTIVATING APPARATUS
Filed June 7, 1966  4 Sheets-Sheet 4
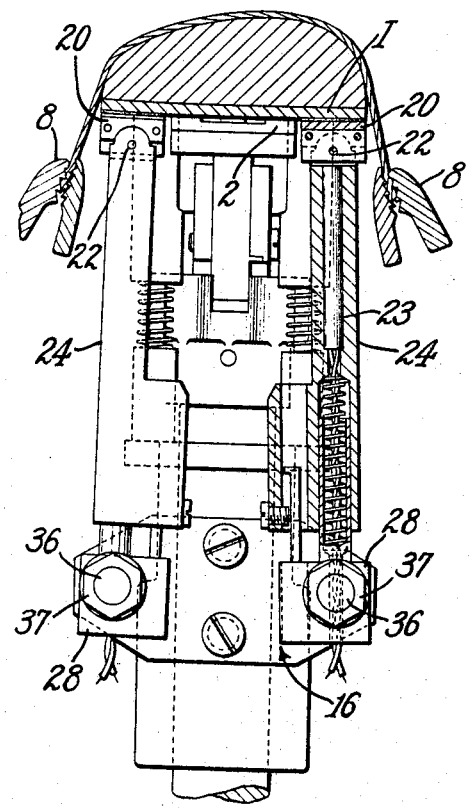
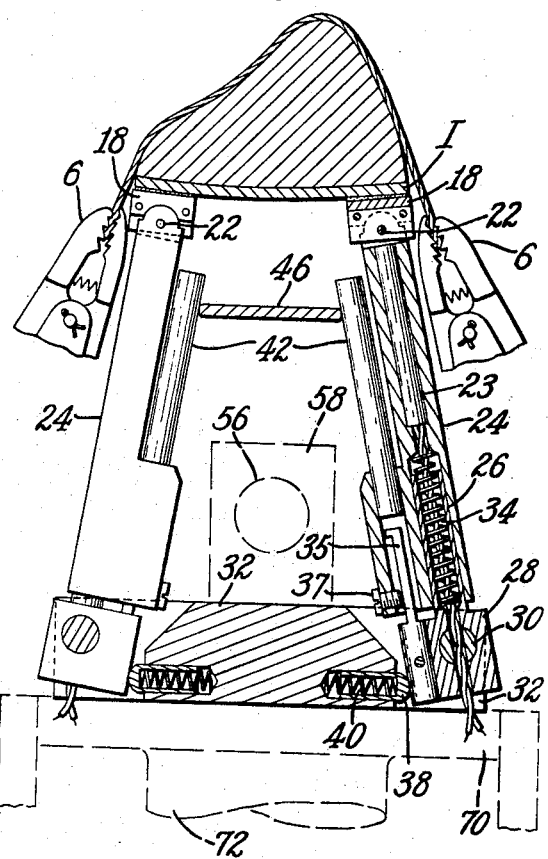
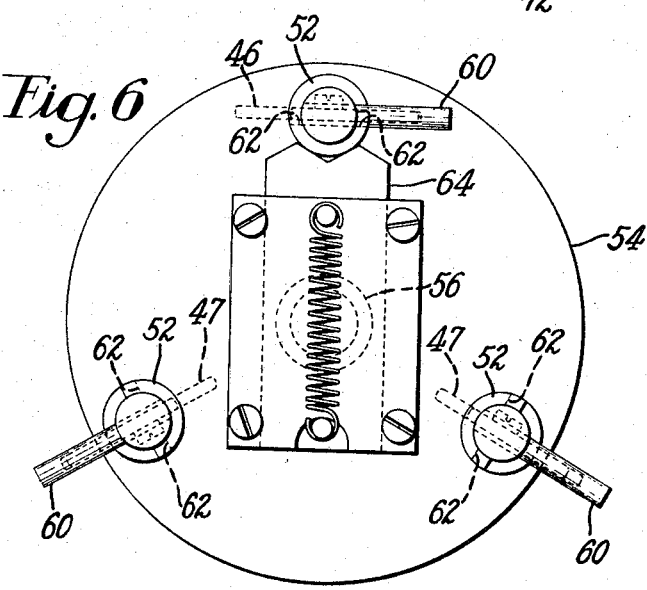

3,418,449
ADHESIVE ACTIVATING APPARATUS
Gerald W. Cleversey, Topsfield, Mass., assignor to United
Shoe Machinery Corporation, Flemington, N.J., a corporation of New Jersey
Filed June 7, 1966, Ser. No. 555,723
10 Claims. (Cl. 219—215)

This invention relates generally to machines for lasting shoes and more particularly is directed to means for activating precoated thermoplastic adhesive on the insole of a shoe during a lasting operation. A typical machine to which the invention may be applied is shown in U.S. Patent No. 3,164,852, granted to R. M. Bowler et al., as modified by mechanism disclosed in U.S. Patent No. 3,226,746, granted to G. J. Marquis et al. It is to be understood, however, that the scope of the present invention is not limited to the particular mechanism or the organization shown.

Due to their superior characteristics thermoplastic adhesives have found increasing use in the lasting of shoes particularly in securing the margins of lasted shoe uppers to the bottoms of insoles. In one preferred method of lasting shoes, the bottom of an insole is precoated with thermoplastic adhesive which is allowed to solidify. The precoated insole is assembled on a last with a shoe upper and placed in a machine such as described in the above patent. The upper is formed about the forepart, ball and shank regions of the last and the precoated adhesive is heat activated to a molten condition for securing the margin of the upper after it is wiped inwardly over the insole bottom.

It has been found that one of the most efficient means of activating such adhesive involves direct contact of a heated surface upon the precoated adhesive. Such direct contact has been accomplished previously along the generally flat forepart of the insole and over the ball area where the shoe bottom curves heightwise toward the heel end as disclosed in U.S. Patent No. 3,271,799 granted to A. R. Hubbard. As described in said Hubbard patent, heated activating surfaces were formed by a series of overlapping flexible plates which generally followed the heightwise curvature of the shoe bottom over the ball region. It was found, however, that such an arrangement was most practical for the manufacture of relatively low-heeled shoes where heightwise curvature is not severe. The mechanism furthermore was not easily adaptable for activating adhesive in the shank area of the shoe heelwardly of the ball region.

Accordingly, it is a general object of the invention to extend the use of thermoplastic adhesive to the lasting of the ball and shank regions of shoes by providing means for activating precoated thermoplastic adhesive in such regions by direct contact with heated surfaces. To this end the machine is provided with a plurality of adjacent heated members, each independently movable heightwise of the shoe into engagement with the precoated bottom of the insole. The members are arranged in rows at opposite sides of the shoe following the heightwise contour of the insole bottom along the ball and shank regions of the shoe. The independent movement of the members permits the heated surfaces formed by the members to be easily varied in shape to suit the heightwise contours of a wide variety of shoes without special adjusting means.

In accordance with one feature of the invention, the heated members also are movable independently widthwise of the shoe to differentially limited positions so that the widthwise curvatures of the rows of members correspond generally to the marginal side contours of the shoe. Another related feature provides for the means limiting the widthwise movements of the heated members to be selectively settable for accommodating right or left shoes alternatively.

According to a further feature, the heated members are movable widthwise and heightwise with respect to a mounting frame which is bodily movable heightwise of the shoe bottom to engage the members with the insole bottom. The frame is adjustable on an axis extending widthwise of the shoe to vary the angular disposition of the members relative to the forepart of the shoe so that the mechanism is adapted to operate on a wide variety of shoes having varying heel heights.

The above and other features of the invention together with novel details of construction and combinations of parts will now be described with reference to the drawings and thereafter particularly pointed out in the claims.

In the drawings:

FIG. 3 is a side elevation of a portion of the mechanism shown in FIG. 2;

FIG. 4 is a section on lines IV—IV of FIG. 3;

FIG. 5 is a section on line V—V of FIG. 3;

FIG. 6 is an end elevation of a portion of the mechanism shown in FIG. 3.

Figure 1:
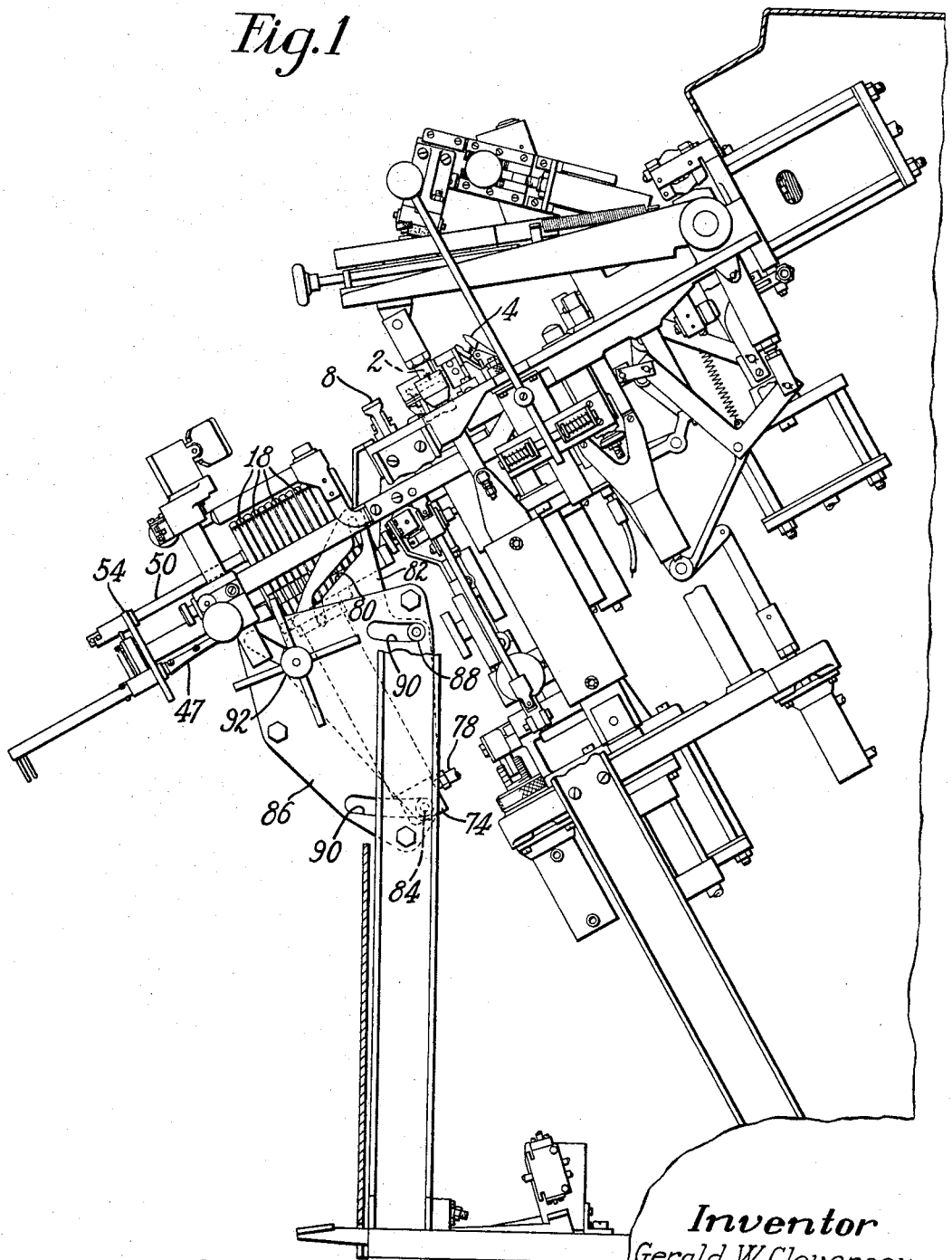
FIG. 1 is a side elevation of a machine embodying the present invention and is generally similar to FIG. 2 of U.S. Patent No. 3,164,852.

A typical machine to which the heat activating unit of the present invention may be applied is described in said Patents Nos. 3,164,852 and 3,226,746. The machine generally includes a shoe rest 2 which supports a last on which an upper and an insole are loosely assembled to position the last heightwise as well as to support it against the action on the upper of a toe gripper 4 and side grippers 6 and 8. The machine is further provided with forepart wipers 10 (FIG. 2) which act after the grippers have pulled the upper to wipe the upper downwardly over the sides of the forepart of the last. The machine also has ball wipers 12 and shank wipers 13 which together with the forepart wipers act to wipe the upper inwardly over the forepart, ball and shank regions of the bottom of the insole on the last.

For securing the margin of the upper to the insole, the forepart, ball and shank regions of the insole bottom are precoated with thermoplastic adhesive which was allowed to solidify before assembly of the insole with the last and upper. Before the wipers wipe the margin of the upper over the bottom of the insole, the solidified adhesive must be heat activated to a molten state. To this end the machine is provided with a generally V-shaped heated member 14 (FIGS. 2 and 3) on which rests the margin of the toeward end of the generally flat portion of the insole bottom. This member acts to heat activate the adhesive at the toe end of the insole in the manner described in said Patent No. 3,271,799. The member 14 is mounted for movement heightwise for engagement with the insole on a bracket 16 which is moved downwardly in any convenient manner when the wipers act to wipe the margin of the upper at the toe end inwardly over the insole bottom.

Figure 2:
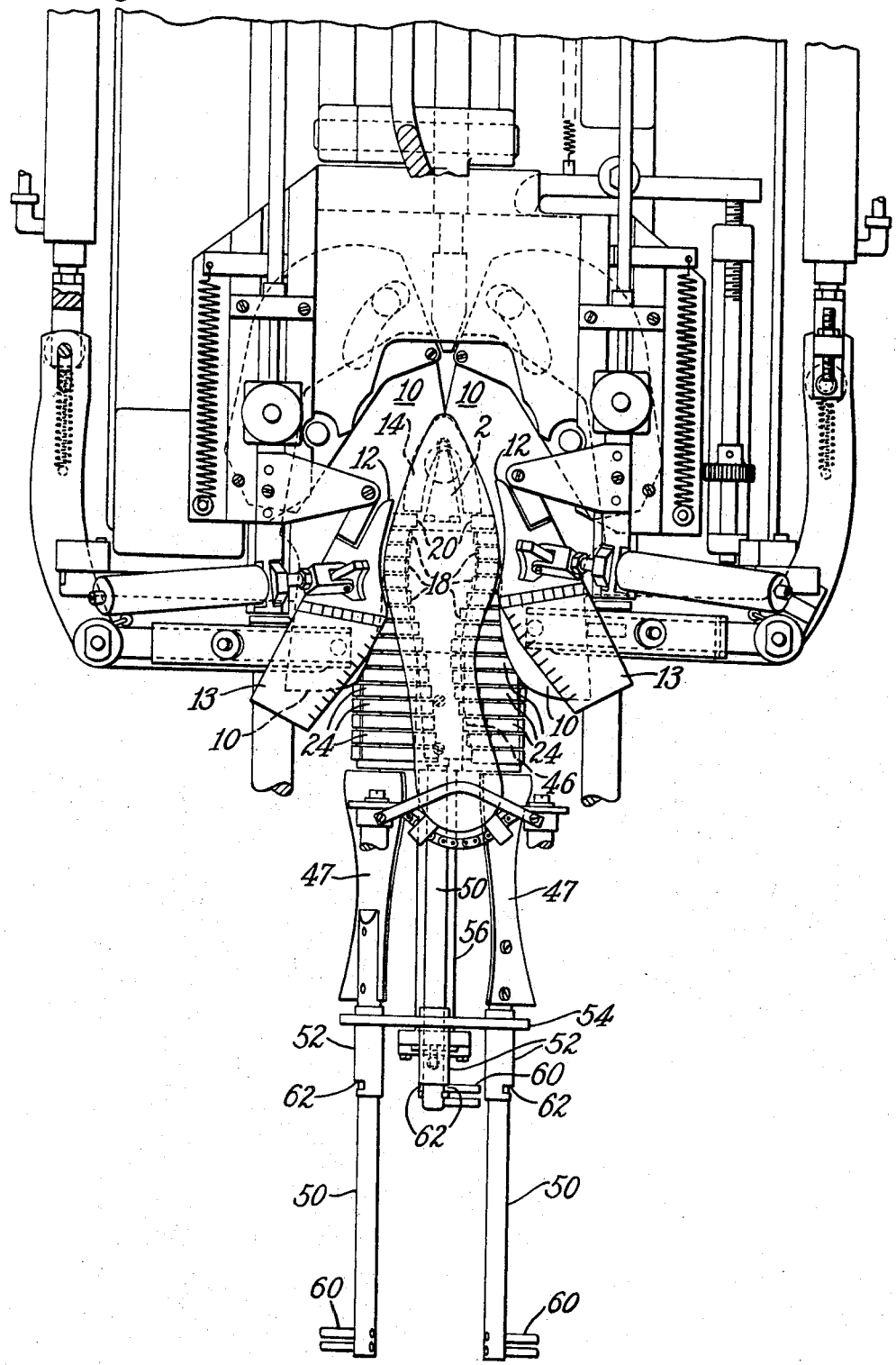
FIG. 2 is a plan view of a portion of the machine shown in FIG. 1.

For activating the adhesive on the heelward end of the forepart of the insole as well as on the ball and shank regions, the machine is provided with a plurality of heated members 18 and 20, each mounted for rocking movement on a pin 22 (FIGS. 4 and 5) in the upper end of an individual upright bar 24. Each bar carrying a member 18 is provided with a heater 23 and is mounted for independent heightwise movement on a tubular portion 26 of a block 28 mounted for widthwise swinging movements on a rod 30 carried at opposite ends on a frame 32. Each tubular member 26 receives a spring 34 which urges the bar 24 heightwise of the shoe to engage the heated member 18 with the insole bottom. To limit the heightwise movement of the bar at a time when no shoe is present in the machine the block 28 is provided with a stop 35 adapted to engage the end of a screw 37 in the bar 24. As seen in FIG. 3, the individual heightwise movement of the members 18 permits them to engage the insole bottom regardless of its heightwise curvature. The heated members 20, FIG. 4, are mounted in a similar manner except that the blocks 28 are pivoted on studs 36 in the bracket 16. The studs are provided with nuts 37 to lock the blocks in adjusted position. The members 18 and 20, as seen in FIGS. 2 and 3, are arranged in rows at opposite sides of the shoe and extend heelwardly from the heated plate 14 along the ball and shank regions of the shoe bottom.

So that the members 18 will engage the insole adjacent the marginal contour, each block 28 is engaged by a pin 38 mounted in the frame 32 and urged outwardly by a spring 40 (FIG. 5). The pins cause the bars 24 to swing inwardly widthwise of the shoe to positions differentially limited by engagement of a rod 42 mounted in the bar with a contoured plate 46. The plate has a contour as seen in FIG. 2, which is spaced inwardly from and follows the marginal contour of the insole bottom. The plate is fixed on the toeward end 48 of a rod 50 (FIG. 3) which is mounted for rotation in a sleeve 52 carried by a disc 54. The disc is rotatably mounted on a post 56 extending heelwardly from a lug 58 upstanding from the frame 32. By this arrangement, the plate 46 may be inverted by manual rotation of the rod 50 in the sleeve 52 as limited by a pin 60 in the rod engaging notches 62 in the heelward end of the sleeve. By inverting the plate 46 in this manner an operator selectively sets the widthwise contour of the rows of heating plates 18 for operating either on right or left shoes. As seen in FIGS. 2 and 6 the machine is provided with two additional plates 47 mounted on the disc 54 in a similar manner as the plate 46. Each of the plates 46 and 47 are adapted to determine the widthwise positions of the heated members 18 for a predetermined range of shoe sizes. For selectively positioning one of the plates 47 between the rows of bars 24 the rod 50 for the plate 46 is rotated to disengage the pin 60 from the notch 62 so the rod and its plate 46 may be moved axially in the sleeve 52 to a disengaged position similar to that of the plates 47. The disc 54 thereupon is rotated until the selected plate 47 is in the uppermost position as seen in FIG. 6 whereupon a spring pressed detent 64 carried on the post 56 and having a V-shaped notch engages the corresponding sleeve 52 to position the plate 47 for insertion between the bars 24. Thereafter, toeward axial movement of the rod 50 within its sleeve 52 positions the selected plate 47 between the bars 24 for setting the activating plates 18 for a different range of sizes.

For moving the members 18 bodily heightwise into engagement with the shoe bottom, the frame 32 is mounted on a plate 70 (FIGS. 3 and 5) carried on the upper end of a cylinder 72. The cylinder is mounted for heightwise movement on a post 74 pivoted on a pin 84 and having an internal bore 76 connected at its lower end with an inlet pipe 78. By admitting fluid under pressure through the pipe 78 the cylinder 72 is moved heightwise on the post to move the heated members 18 as a unit into engagement with the insole bottom to activate the precoated adhesive thereon. Each member 18 stops upon engagement with the insole and its associated spring 34 yields during continued upward movement of the frame 32.

During the inwiping movements of wipers 10, 12 and 13, fluid is exhausted from the pipe 78 permitting the entire assembly to drop of its own weight to the position shown in phantom in FIG. 3. The assembly is guided in its heightwise movements by pins 79 extending outwardly from the plate 70 into slots 80 in an adjustable frame 82. The frame 82, in addition to the pin 84, is also provided with pins 88 which are received in arcuate slots 90 in side plates 86 fixed on the machine frame. By adjusting the frame 82 so the pins 84, 88 are moved along the slots 90, the entire activating assembly may be swung heightwise about an axis approximately at the ball line of the shoe in the machine as seen in FIG. 3. In this manner the activating assembly is adjustable for operating on shoes of widely varying heel height. For fixing the angular disposition of the assembly, a lock nut 92 having handles 94 is provided to lock the frame 82 to the side plates 86.

While the foregoing described one embodiment of the invention, it should be understood that equivalent mechanisms could be substituted and used in different types of machines without departing from the scope of the invention as defined in the following claims:

What is claimed is:

1. In a machine for lasting shoes of the type having thermoplastic adhesive precoated on the bottom of an insole for securing the margin of a lasted shoe upper, mechanism for heat activating said adhesive including a plurality of adjacent heated members, and means mounting each member for independent movement heightwise of the shoe into engagement with the precoated bottom of the insole, said members being arranged in rows at opposite sides of the shoe following the heightwise contour of the shoe bottom.

2. A machine according to claim 1 and having means for moving each member independently widthwise of the shoe, and means differentially limiting the widthwise movement of said members for engagement with the insole bottom adjacent the marginal side contour of the insole.

3. A machine according to claim 1 and having means for moving each member independently widthwise inwardly of the shoe and means interposed between the rows of members for differentially limiting the widthwise movements of said members for positioning said members for engagement with the insole adjacent the marginal side contours of the insole.

4. A machine according to claim 3 in which said limiting means includes a plate having a shape generally similar to the marginal side contours of the shoe to be operated upon.

5. A machine according to claim 2 and having means for selectively setting said limiting means for disposing said members for operation on right or left shoes.

6. A machine according to claim 3 in which the limiting means is selectively settable for disposing said members for operation on right or left shoes.

7. A machine according to claim 3 in which the limiting means includes a contoured plate selectively reversable for setting said members for operation on right or left shoes.

8. A machine according to claim 1 in which said heated members comprise blocks engageable with the insole bottom and individually mounted on members yieldable heightwise of the shoe, said members being mounted for individual widthwise movement on a frame movable heightwise toward and away from the insole bottom whereby movement of the frame toward the insole causes the blocks to yieldingly engage the insole bottom along the heightwise contour of the insole.

9. A machine according to claim 8 in which said frame is adjustable about an axis extending widthwise of the shoe to vary the angular disposition of said members relative to the generally flat forepart of the shoe bottom for operating on shoes of varying heel heights.

10. A machine according to claim 4 in which there are provided a plurality of plates each adapted to determine the widthwise positions of said members for operating on a predetermined range of shoe sizes, and means for selectively interposing a particular plate suitable for the size of shoe to be operated upon.

References Cited

UNITED STATES PATENTS

| | | | |
|---|---|---|---|
| 2,050,377 | 8/1936 | Pym | 12—12 X |
| 2,212,552 | 8/1940 | Rohrer | 12—12 |
| 3,082,449 | 3/1963 | Bowler et al. | 12—12 |
| 3,226,745 | 1/1966 | Marquis | 12—12 |

RICHARD M. WOOD, *Primary Examiner.*

C. L. ALBRITTON, *Assistant Examiner.*

U.S. Cl. X.R.

12—12